Sept. 21, 1965   J. S. MORREL   3,208,064
AIRCRAFT COLLISION WARNING SYSTEM
Filed May 31, 1957   2 Sheets-Sheet 1

JOHN S. MORREL
INVENTOR

BY
Hillman and Kerst
ATTORNEY

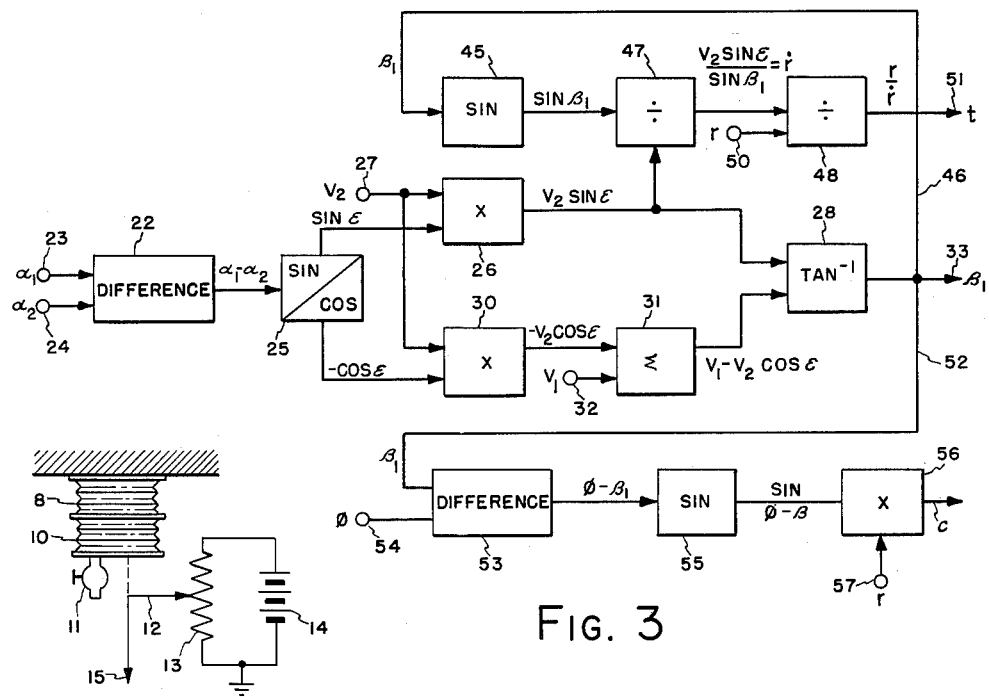
FIG. 3
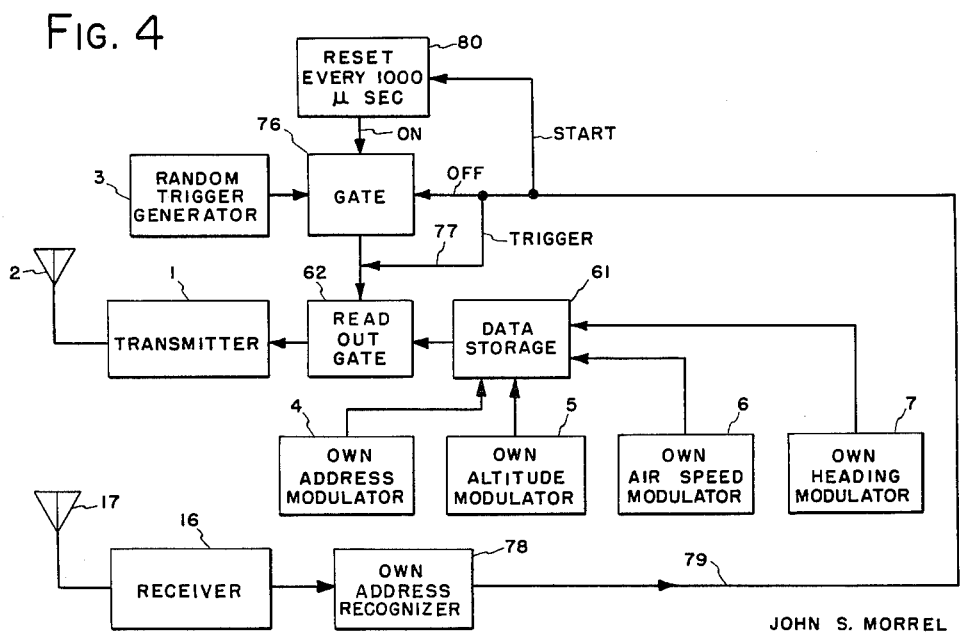
FIG. 4
FIG. 5

United States Patent Office 3,208,064
Patented Sept. 21, 1965

3,208,064
AIRCRAFT COLLISION WARNING SYSTEM
John S. Morrel, Ruxton, Baltimore, Md., assignor to The Bendix Corporation, a corporation of Delaware
Filed May 31, 1957, Ser. No. 662,640
17 Claims. (Cl. 343—6)

This invention relates to the prevention of collisions between aircraft.

It is now generally agreed that public safety requires some mechanism which will provide the pilot of an aircraft with timely warning of the presence of another aircraft travelling at such a speed and on such a course as to render collision between the two aircraft probable unless one or both perform an escape maneuver.

The amount of time necessary to perform such a maneuver effectively, after the pilot is first made aware of the existence of the dangerous situation, has not been generally understood.

It has now been shown mathematically that the minimum time required to perform an effective escape maneuver lies between thirty to sixty seconds, which time is nearly independent of airspeed.

It has also been shown that substantially complete and accurate data on relative position and velocity are necessary to make the best choice of escape maneuver. The completeness and accuracy required of this data is such that it cannot be acquired from one aircraft alone, but requires some sort of cooperative system.

The system must also avoid the giving of any warning unless collision is probable. The mere proximity of two aircraft should not activate it. Otherwise, it will become a nuisance and warnings will go unheeded.

The system must also make a minimum of demand on the pilot, in order to avoid adding to his already burdensome duties and to minimize the possibility of human error in determining the probability of collision.

With these considerations in mind the objects of the invention include the provision of an aircraft collision warning system which is cooperative in nature; which gives a warning only when a collision is probable; which requires no action from the pilot in the determination of the probability of collision; and which informs the pilot when the probability of collision has ceased to exist.

These, and other objects and advantages of the invention are realized in a system in which each aircraft continuously transmits, at random intervals, and by suitable code, its future altitude at, say, 45 seconds hence, its identity, (address), its heading and airspeed. Each craft compares the altitude of any such transmission it receives with its own altitude. If they differ by more than, say 1,000 feet, the random transmissions continue and the received data is not further utilized.

If the altitudes differ by less than the thousand foot interval, the received data is fed to a triangle solving computer, together with the information as to own craft's airspeed and heading. The computer derives, from this information, the direction of the relative velocity vector of the two crafts. Simultaneously, the bearing of the other (target) craft is being taken, for example, by a direction finding receiver. The bearing and the direction of the relative velocity vector are compared and if they differ by more than a predetermined amount no further use is made of the received data. If they differ by less than this amount, the random transmissions are terminated and a transponding action is set up between the two craft. Range is measured as a function of the repetition rate of the transponding transmissions and applied to the computer. The computer utilizes this information to compute the time to nearest approach of the two craft.

The bearing information is also applied to the computer and is utilized to compute the miss distance at time of closest approach. The miss distance and time of closest approach are fed to a warning device which issues a warning if the miss distance is less than a predetermined acceptable value at one minute from the instant of closest approach. If still unacceptable at 30 seconds from the instant warning device triggers an escape maneuver indicator to which the direction of the relative velocity vector and the relative altitudes of the two craft have also been fed. The indicator indicates to the pilot the proper escape maneuver to take, based on an established convention governed by the direction of the relative velocity vector.

In the drawings:

FIG. 3 is a schematic block diagram of a triangle solver useful in the system of FIG. 1;

FIG. 4 is an elevational view of an altitude predicting device used in the system illustrated;

FIG. 5 is a schematic block diagram of a system as carried in a small aircraft and useable in cooperation with the system of FIG. 1.

Figure 1:
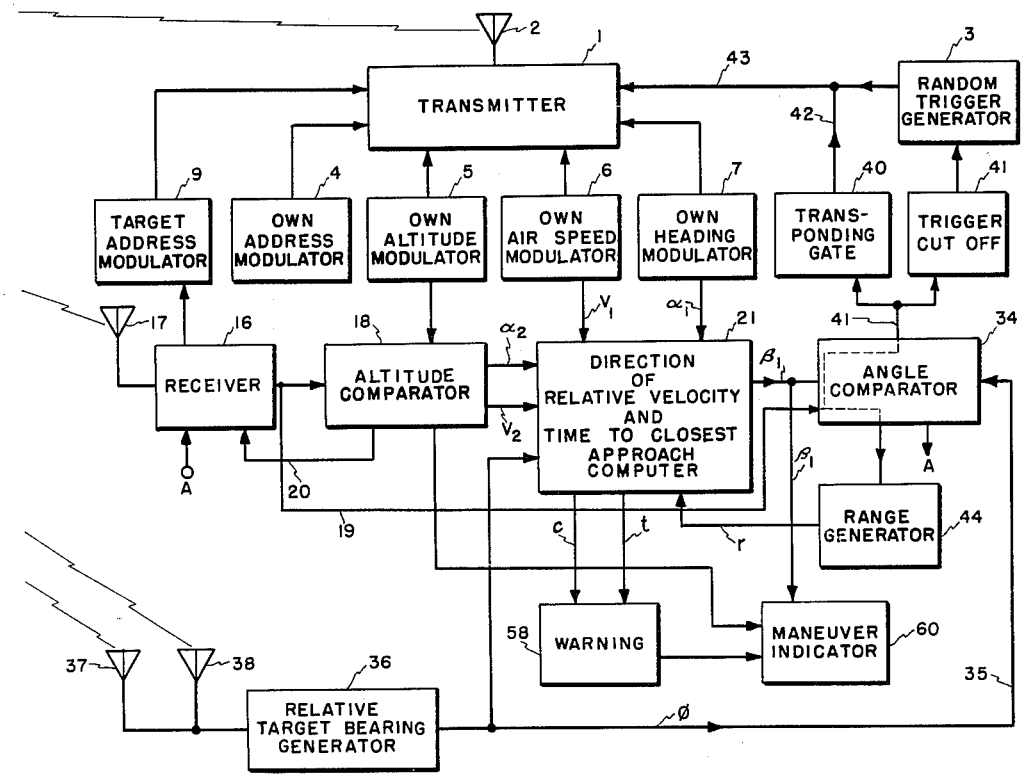
FIG. 1 is a schematic block diagram of a generalized version of a system embodying the invention.

Referring more particularly to the drawing, the block diagram of FIG. 1 depicts the major components of a system conforming to the invention and intended to be carried by each aircraft. The system includes a transmitter 1 having an omnidirectional antenna 2 and transmitting a coded message at random intervals determined by a random trigger generator 3 which triggers each transmission. Any of several methods of coding may be used, such as pulse pairs, modulated pulse groups, or binary digital coding. A preferred method utilizes the digital-binary Gray scale.

The transmitter is supplied with signal inputs from an own address modulator 4, an own altitude modulator 5, an own airspeed modulator 6, and an own heading modulator 7.

The own address modulator provides a modulation consisting of an assigned identifying number.

The own altitude modulator provides a signal representing the predicted altitude of the craft at a future time, say 45 seconds. This may be obtained from a barometric device, such as illustrated in FIG. 4. This device comprises a standard sealed barometric cell 8 having one end secured to a fixed part of the aircraft structure and a leaky barometric unit 10 secured to the other end. The unit 10 is provided with a valved connection 11 to the atmosphere. By proper setting of the valve the position of the free end of the unit 10 may be utilized as an indication of predicted altitude at a selected future time. A slider 12, moved by the unit 10 along a resistor 13 having a voltage source 14 across its terminals, provides at a terminal 15 an output voltage proportional to the position of the slider. This voltage may be converted to the form of coding in use by known techniques.

The "own airspeed" signal may likewise be an analogue voltage derived from the craft's airspeed meter and converted to the form of coding in use.

The "own heading" signal may be similarly derived from the craft's gyro compass and similarly encoded.

The transmitter has a limited range, say twenty miles, to limit communication to craft in sufficient proximity to render a collision possible within a minute at maximum closing speeds of present aircraft. IFF equipment and frequencies may be used.

The craft also carries a receiver 16 equipped with an omnidirectional antenna 17. A target address modulator 9 adds the target's address to each transmission as an acknowledgment. The receiver output is also fed to an altitude comparator 18 which also receives information from "own altitude" modulator 5. The altitudes are compared and unless they are within a certain limiting proximity, say 1,000 feet, the remainder of the received information is not passed to the rest of the system and stored information in the receiver 16 may be cleared, if required, by way of a signal on lead 20. Stored information in the buffer storage soon disappears.

If the altitudes are within the prescribed limit the data representing the target aircraft's heading angle and airspeed are supplied through the altitude comparator 18 to a triangle solving computer 21 information received is transferred from the buffer storage unit 83 to the write register 85 by way of the read out gate 84. This gate is activated for this purpose by an enabling signal emitted from the altitude comparator and applied by lead 20. The latter signal may also be used, if desired, to actuate a similar gate in the relative target bearing generator. The information is applied to the main storage unit 86 by the write register. From this unit the information as to target heading and speed is applied by the leads $\alpha_2$ and $V_2$ to a triangle solving computer 21, while information as to own address and target address is abstracted by the respective registers 88 and 89.

Figure 2:
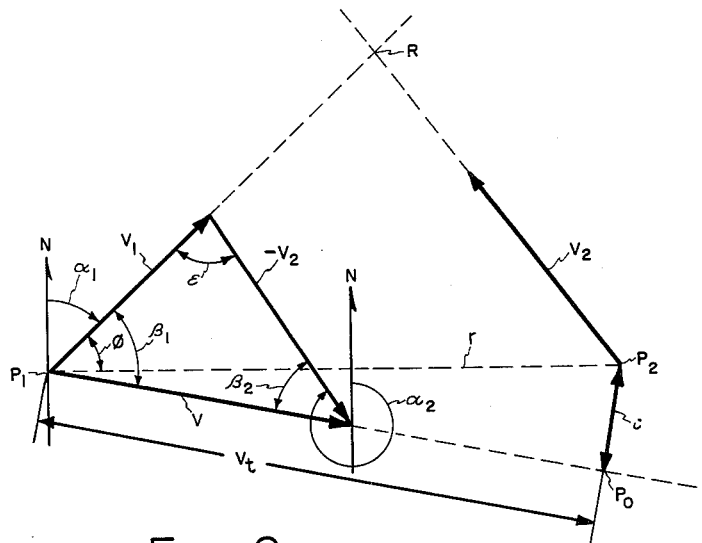
FIG. 2 is a composite position and relative velocity triangle illustrating the relationships used in the triangle solver of the system of FIG. 1.

Before considering the construction and operation of the triangle solver, attention is directed to the triangles of FIG. 2 on which its operation is based. The present positions of own craft and target craft are indicated as $P_1$ and $P_2$, respectively. They are joined by a line $r$, the length of which is present range and the direction of which is the bearing line of the two craft. The heading of own craft is along a line $P_1R$ and the velocity vector is the solid portion $V_1$ of the line. The target heading is along a line $P_2R$ and its velocity vector is the solid line $V_2$. $R$ is the point at which any collision must occur.

The inverse of velocity vector $V_2$ has been drawn from the end of $V_1$ and the point $P_1$ has been joined with the end of $-V_2$ to form the relative velocity vector $V$. This line has been prolonged and at the point $P_0$ a perpendicular $c$ has been erected to $P_2$.

The angle from north to $V_1$ has been designated $\alpha_1$ and that from north to $-V_2$ has been designated $\alpha_2$. The angle between $V_1$ and $-V_2$ has been indicated as $\epsilon$. The angle between $V_1$ and $V$ has been indicated as $\beta_1$. The angle between $V_1$ and $r$ has been designated $\phi$. The angle between $-V_2$ and $V$ has been indicated as $\beta_2$.

$\alpha_1$ is the true bearing or heading of own craft and $\alpha_2$ the true bearing of heading of the target craft. $\phi$ is the relative bearing of the target craft and $\beta_1$ is the bearing of the relative velocity vector from own craft.

The triangle solver makes use of the following equations for deriving $\beta_1$:

$$\epsilon = 360 - (\alpha_2 - \alpha_1)$$

$$\tan \beta_1 = \frac{V_2 \sin \epsilon}{V_1 - V_2 \cos \epsilon}$$

which may be written:

$$\tan \beta_1 = \frac{V_2 \sin (\alpha_1 - \alpha_2)}{V_1 - V_2 \cos (\alpha_1 - \alpha_2)}.$$

Time to nearest approach may be obtained by use of the following equations:

$$\frac{V_2 \sin \epsilon}{\sin \beta_1} = \dot{r}$$

and $$\frac{r}{\dot{r}} = t$$

Miss distance, which is $c$ in the diagram, may be obtained from the equation:

$$r \sin (\beta_1 - \phi) = c.$$

A triangle solver which will provide analogue solutions for the above equations is shown in FIG. 3. Taking the equation for $\beta_1$ first, there is provided a difference element 22 to which are applied the inputs $\alpha_1$ and $\alpha_2$ from terminals 23 and 24, respectively. The output of this element is applied to a sine and cosine deriving unit 25. The sine output is applied to a multiplier 26, to which is also applied the quantity $V_2$ from terminal 27. The output of this unit, which is $V_2 \sin \epsilon$, is applied to a tan$^{-1}$ unit 28. The cosine output of unit 25 is applied with a negative sign to a multiplier 30 to which $V_2$ is also applied from terminal 27. The output of multiplier 30, which is $-V_2 \cos \epsilon$, is applied to a summer 31, to which is also applied the quantity $V_1$ from a terminal 32. The output of summer 31, which is $V_1 - V_2 \cos \epsilon$, is applied to the tan$^{-1}$ unit 28. The output of the latter unit, which is $\beta_1$, is available at terminal 33.

Returning now to FIG. 1, we find the $\beta_1$ output of triangle solver 21 applied to an angle comparator 34. To this unit is also applied a quantity representing the angle $\phi$. This quantity is fed by way of a conductor 35 from a relative target bearing generator 36 which may be a direction finding receiver utilizing a pair of spaced antennas in a known fashion and deriving the angle $\phi$ as a function of the phasing of the received signal at the two antennas. One of these may be the antenna 17, if desired.

If the comparison of the angles $\phi$ and $\beta_1$ in comparator 34 shows a difference less than a predetermined amount, which has been accepted as the limit beyond which probability of collision is negligible, the comparator provides an output which opens a transponding gate 40 and actuates a trigger cut-off 41, cutting off random trigger generator 3 and thus completes the transponding loop to the trigger input of the transmitter 1. The transponding signal output of comparator 34 is a trigger signal derived from the output, on line 19, of receiver 20 and is applied by conductor 41 to gate 40 and thence, by way of conductors 42 and 43 to the transmitter to trigger it into transmission. This transponding continues as long as altitude comparison and angle comparison indicate the probability of collision. If it is desired to prevent the possibility of simultaneous recognition of the situation and simultaneous initiation of transponding with crossing transponding signals, a convention may be adopted with respect to identity codes, whereby they are compared and the lower (or higher) initiates the transponding action.

If the output of comparator 34 is outside the above mentioned limit it does not actuate the transponding gate 40, nor cut off generator 3, and random transmission continues. If required by the transmission system employed a feedback from terminal A may apply to receiver 16 a signal clearing the message therefrom and resetting it for incoming messages.

Each transponding signal from comparator 34 is also applied to a range generator 44 which measures the repetition rate of the transponding transmissions and derives therefrom the range of the target. This is applied to the triangle solving computer 21 to determine time to closest approach ($t$).

The portion of the computer 21 of FIG. 3 which derives $t$ comprises a sine resolver 45 which receives $\beta_1$ from the output of unit 28 by way of a conductor 46. The output of 45, $\sin \beta_1$, is applied to a divider unit 47, to which is also applied $V_2 \sin \epsilon$ from the output of unit 26. The result is $$\frac{V_2 \sin \epsilon}{\sin \beta_1} = \dot{r}$$

which is applied to a divider unit 48. To this unit is also fed $r_1$ from a terminal 50. The resultant $r/\dot{r}$ is $t$, available at a terminal 51.

In solving for miss distance $c$ the output of 28, which is $\beta_1$, is applied by a conductor 52 to a difference unit 53, to which is also applied the measured value of $\phi$ from a terminal 54. The output of this unit, $\phi - \beta_1$ is applied to a sine resolver 55, from which $\sin (\phi - \beta_1)$ is fed to a multiplier unit 56, where it is multiplied by $r$ applied at a terminal 57. The output of this unit is $c$.

The quantities $c$ and $t$ are fed to a warning device 58, which issues a warning if the miss distance $c$ is below an acceptable value when $t$ is equal to or less than one minute. If $c$ is still less than an acceptable value at $t=30$ seconds, the warning device activates an escape maneuver indicator 60, which also has $\beta_1$ and information as to relative altitudes applied thereto. The latter information is fed from altitude comparator 18. This indicator indicates one of four escape maneuvers which, in accordance with a set of "rules of the road" issued to all aircraft, the pilot should perform at once. The choice of maneuver is based on the value of $\beta_1$ and the relative vertical orientation of the target craft and, by way of example, could be as follows:

Target craft approaching:

From ahead—turn right
From behind—turn left
From right or below—turn up
From left or above—turn down.

All the blocks of the diagrams of FIGS. 1 and 4 can be supplied from components and circuits known to the art.

FIG. 5 shows an adaptation of the system to small craft in which the amount of equipment carried must be kept to a minimum. The equipment comprises the transmitter 1 with an associated read out gate 62 and a data storage unit 61 receiving information from own address unit 4, own altitude unit 5, own airspeed unit 6, and own heading unit 7. A random trigger generator 3 communicates by way of a gate 76 with the read out gate unit. This gate is normally on.

The receiver 16 is present, feeding into an own address recognizer 78, the output of which is applied to the gate 76, by way of a conductor 79, cutting it off when own address is received and is applied to the read out gate 62 as triggering voltage via branch conductor 77. A reset means 80 turns on gate 76 every 1,000 microseconds. The small craft transmits the usual information at random intervals until it receives and recognizes its own address, at which time the random trigger generator is gated out of the system and the address is substituted as a trigger so that transponding is initiated. At 1,000 microsecond intervals the random transmission is again initiated by the action of the reset unit 80.

The operation of the collision avoidance system of the present invention will now be described. Fully equipped aircraft carrying the equipment of FIG. 1 and minimum equipped aircraft carrying the equipment of FIG. 5 normally operate to transmit at random intervals radio frequency signals which are modulated in accordance with the information derived from the modulators 4, 5, 6 and 7 to transmit to all nearby aircraft information as to the transmitting aircraft's own address, own altitude, own airspeed and own heading respectively. Each aircraft receives these transmissions from the nearby aircraft and in the case of the fully equipped system of FIG. 1 the receiver 16 derives the target address coding from the received signal and applies it to the target address modulator 9 for addition to the signals transmitted by the transmitter 1. This target address modulation is not required in the function of the minimum equipped aircraft of FIG. 1. The fully equipped aircraft employing the system of FIG. 1 compares the altitude data of the received signal with its own altitude in altitude comparator 18 and if the altitude signals indicate an altitude correspondence within predetermined limits the demodulated signals representing the target aircraft's heading and airspeed are passed to the computer 21. The computer 21 which is shown in detail in FIG. 3 is supplied with sufficient additional data to compute $\beta_1$, the bearing angle of the relative velocity vector V, as shown in FIG. 2. The angle $\beta_1$ is compared in the angle comparator 34 with the angle $\phi$ obtained from a direction finding receiver 36. The comparison of the angle $\beta_1$ and $\phi$ determines the amount by which these angles differ and where the difference is within a predetermined range of values for which the direction of the relative velocity vector V approaches the line of sight direction between the aircraft as determined by the direction finding receiver 36 in its derivation of the angle $\phi$, the angle comparator is effective to cut off random trigger generator 3 by means of trigger cutoff device 41 and also to open gate 40 to complete the transponding path. In the apparatus of FIG. 1 and FIG. 5 respectively, the transponding path is completed upon the attainment of altitude and angle comparison within the limits set for the system of FIG. 1 or upon the recognition of an aircraft's own address by the own address recognizer 78 of FIG. 5. For these conditions the transponding path is completed from the receiver 16 to the transmitter 1 in each case by supplying pulse signals from the receiver output over lines 19 and 79, respectively, which signals are effective to pass the gates 40 and 62, respectively, to the trigger input to the transmitter 1. For the system of FIG. 5, the initiation of transponding completes the functional requirements of the apparatus and the transponding signals are utilized by the fully equipped aircraft with which it is transponding.

Upon the initiation of transponding in the system of FIG. 1 the transponding signals from line 19 are also made available by the angle comparator 34 to the range generator 44 to measure the repetition rate of the transponding signals which in accordance with well known transponding techniques represents the range between the transponding stations after due allowance is made for the constant delays involved in the transmissions path as introduced by the various equipments at the two stations. With the range value computed by the range generator 44 available and applied to the computer 21, the quantities "miss distance" and "time to nearest approach" are further computed as shown in FIG. 3 and utilized when predetermined values thereof are computed to initiate a warning indication from warning indicator 58 and a maneuver indication from maneuver indicator 60 in accordance with the prescribed convention established for such maneuvers. As soon as altitude comparison in comparator 18 or angle comparison in comparator 34 are such that the target aircraft is no longer a threat to the transmitting aircraft the conditions for transponding will be interrupted and the random trigger generator 3 resumes its function of triggering the transmitter 1 at random intervals pending the receipt of the next received signals which satisfy conditions for initiating the transponding condition.

What is claimed is:

1. An aircraft collision prevention system for preventing collision between a first craft and other craft comprising: means on each craft transmitting in coded form the identifying address, predicted altitude at a selected future time, heading and airspeed thereof, means triggering said transmitting means at random intervals, a receiver for receiving similar transmissions from any of said other craft, a triangle solving computer, means for comparing the altitude of said first aircraft with that included in one of said received transmissions, means applying to said computer the airspeed and heading included in said received transmission if said compared altitudes differ by less than a predetermined amount, means applying the airspeed and heading of said first craft to said computer, means in said computer responsive to said applied data to derive the direction of the relative velocity vector with respect to said first craft and the craft from which said transmission was received, means measuring the relative bearing of the latter craft, means comparing said relative bearing and said direction of said relative velocity vector, means to terminate said random interval transmission and substitute transmissions triggered by said received transmissions whereby a transponding action between said first craft and said latter craft is initiated, means measuring the repetition rate of said transponding action and deriving the range between said first craft and said latter craft from said rate, means responsive to the proximity of said direction of said relative velocity vector and said relative bearing within a predetermined limit to initiate said transponding action and activate said range measuring means, means applying said range so determined to said triangle solving computer, means in said computer to compute the time to closest approach between said aircraft, means applying to said computer said measured bearing, means in said computer to compute the miss distance at said time of closest approach, a warning device, means applying to said warning device said time of closest approach and said miss distance, means activating said warning device when said miss distance is less than a predetermined value at a first predetermined time of closest approach, a maneuver indicator, means applying said direction of said relative velocity vector and information as to the relative altitude of said first craft and said latter craft to said maneuver indicator and means activating said maneuver indicator when said miss distance is less than a predetermined minimum at a second predetermined time of closest approach, said maneuver indicator indicating a preselected escape maneuver based on the direction of approach of said latter craft as determined by said relative velocity vector and relative altitude information.

2. An aircraft collision prevention system for preventing collision between a first craft and other craft comprising means on each craft transmitting in coded form the identifying address, predicted altitude at a selected future time, heading and airspeed thereof, means triggering said transmitting means at random intervals, a receiver for receiving similar transmissions from any of said other craft, a triangle solving computer, means for comparing the altitude of said first aircraft with that included in one of said received transmissions, means applying to said computer the airspeed and heading included in said received transmission if said compared altitudes differ by less than a predetermined amount, means applying the airspeed and heading of said first craft to said computer, means in said computer responsive to said applied data to derive the direction of the relative velocity vector with respect to said first craft and the craft from which said transmission was received, means measuring the relative bearing of the latter craft, means comparing said relative bearing and said direction of said relative velocity vector, means to terminate said random interval transmission and substitute transmissions triggered by said received transmissions whereby a transponding action between said first craft and said latter craft is initiated, means measuring the repetition rate of said transponding action and deriving the range between said first craft and said latter craft from said rate, means responsive to the proximity of said direction of said relative velocity vector and said relative bearing within a predetermined limit to initiate said transponding action and activate said range measuring means, means applying said range so determined to said triangle solving computer, means in said computer to compute the time to closest approach between said aircraft, means applying to said computer said measured bearing, means in said computer to compute the miss distance at said time of closest approach, a warning device, means applying to said warning device said time of closest approach and said miss distance, and means activating said warning device when said miss distance is less than a predetermined value at a predetermined time of closest approach.

3. An aircraft collision prevention system for preventing collision between a first craft and other craft comprising means on each craft transmitting in coded form the identifying address, predicted altitude at a selected future time, heading and airspeed thereof, means triggering said transmitting means at random intervals, a receiver on each of said craft for receiving similar transmissions from any of said other craft, a triangle solving computer on at least one of said craft, means on at least said one craft for comparing the altitude of said first aircraft with that included in one of said received transmissions, means applying to said computer the airspeed and heading included in said received transmission if said compared altitudes differ by less than a predetermined amount, means applying the airspeed and heading of said one craft to said computer, means in said computer responsive to said applied data to derive the direction of the relative velocity vector with respect to said one craft and the craft from which said transmission was received, means on at least said one craft measuring the relative bearing of the latter craft, means on at least said one craft comparing said relative bearing and said direction of said relative velocity vector, means on each of said craft to terminate said random interval transmission and substitute transmissions triggered by said received transmissions whereby a transponding action between said one craft and said latter craft is initiated, means on said one craft measuring the repetition rate of said transponding action and deriving the range between said first craft and said latter craft from said rate, means on said one craft responsive to the proximity of said direction of said relative velocity vector and said relative bearing within a predetermined limit to initiate said transponding action and activate said range measuring means, means applying said range so determined to said triangle solving computer, means in said computer to compute the time to closest approach between said aircraft, means applying to said computer said measured bearing, means in said computer to compute the miss distance at said time of closest approach, a warning device on said one craft, means applying to said warning device said time of closest approach and said miss distance, means activating said warning device when said miss distance is less than a predetermined value at a first predetermined time of closest approach, a maneuver indicator on said one craft, means applying said direction of said relative velocity vector and information as to the relative altitude of said one craft and said latter craft to said maneuver indicator and means activating said maneuver indicator when said miss distance is less than a predetermined minimum at a second predetermined time of closest approach, said maneuver indicator indicating a preselected escape maneuver based on the direction of approach of said latter craft as determined by said relative velocity vector and relative altitude information.

4. An aircraft collision prevention system for preventing collision between a first craft and other craft comprising means on each craft transmitting in coded form the identifying address, predicted altitude at a selected future time, heading and airspeed thereof, means triggering said transmitting means at random intervals, a receiver on each of said craft for receiving similar transmissions from any of said other craft, a triangle solving computer on at least one of said craft, means on at least said one craft for comparing the altitude of said first aircraft with that included in one of said received transmissions, means applying to said computer the airspeed and heading included in said received transmission if said compared altitudes differ by less than a predetermined amount, means applying the airspeed and heading of said one craft to said computer, means in said computer responsive to said applied data to derive the direction of the relative velocity vector with respect to said one craft and the craft from which said transmission was received, means on at least said one craft measuring the relative bearing of the latter craft, means on at least said one craft comparing said relative bearing and said direction of said relative velocity vector, means on each of said craft to terminate said random interval transmission and substitute transmissions triggered by said received transmissions whereby a transponding action between said one craft and said latter craft is initiated, means on said one craft measuring the repetition rate of said transponding action and deriving the range between said first craft and said latter craft from said rate, means on said one craft responsive to the proximity of said direction of said relative velocity vector and said relative bearing within a predetermined limit to initiate said transponding action and activate said range measuring means, means applying said range so determined to said triangle solving computer, means in said computer to compute the time to closest approach between said aircraft, means applying to said computer said measured bearing, means in said computer to compute the miss distance at said time of closest approach, a warning device on said one craft, means applying to said warning device said time of closest approach and said miss distance, and means activating said warning device when said miss distance is less than a predetermined value at a predetermined time of closest approach.

5. An aircraft collision prevention system for preventing collision between a first craft and other craft comprising: means on said first craft to communicate to other craft within a predetermined range information as to its altitude, identity, airspeed and heading, a triangle solving computer on said first craft, means on said first craft to compare its own altitude with that of each other craft in communication with it to apply to said computer information as to its own airspeed and heading and to apply to said computer the information received from such other craft as to its airspeed and heading if the altitudes so compared differ by less than a predetermined amount, means in said computer for deriving from said applied information the direction of the relative velocity vector between the craft to which said information relates, means on said first craft measuring the relative bearing angle between said first craft and said other craft from which said information is received, means comparing said direction of said relative velocity vector and said bearing angle, means measuring the range of said other craft from which said information is received, means applying information as to said range to said computer, means applying information as to said bearing angle to said computer, a warning device in said first craft, means in said computer utilizing said information supplied thereto to derive the time of closest approach and the miss distance at said time between said first craft and said craft from which said information is received, means applying information as to said time and miss distance to said warning device, said warning device being responsive to a value of said miss distance less than a preselected value at a preselected value of said time to issue a warning.

6. An aid to the avoidance of collision between vehicles moving without constraint in a common isobar comprising, means on a first vehicle for transmitting data describing its velocity vector to a second vehicle when the distance between said evhicles becomes sufficiently small to present a potential and imminent danger of collision, means on said second vehicle for receiving said data, means on said second vehicle for combining said received data with data describing its own velocity vector to obtain the closing velocity vector, and means on said second vehicle for determining when a predetermined difference exists between the bearing of said closing vector and the bearing of said first vehicle.

7. An aid to the avoidance of collision between vehicles supported by displacement of a fluid medium wherein each said vehicle tends to move at a level of constant fluid pressure comprising, on each said vehicle, means for measuring said fluid pressure, means for measuring its velocity vector in said fluid, means for mutually exchanging data describing said measures between vehicles sufficiently close to present an imminent possibility of collision, means for comparing received measures of pressure with its own measure of pressure and means effective upon finding a near identity of any said received measure of pressure with its own measure of pressure to combine the accompanying data describing a velocity vector with the data describing its own velocity vector to obtain the related closing velocity vector.

8. A system according to claim 7, in which each said means for measuring fluid pressure is combined with means for measuring the rate of change of fluid pressure to yield a predicted measure of fluid pressure.

9. A system according to claim 7, combined with further means for determining the angular difference between the bearing of the source of said accompanying data and the bearing of said closing vector.

10. A system according to claim 9, in which each said means for measuring fluid pressure is combined with means for measuring the rate of change of fluid pressure to yield a predicted measure of fluid pressure.

11. A system for preventing collisions between two vehicles comprising: first means including a transmitter carried by a first vehicle and adapted to periodically transmit signals representative of the speed and heading of said first vehicle; second means including a receiver carried by a second vehicle and adapted to selectively receive the signals transmitted by said first vehicle; third means including a computer carried by said second vehicle and responsive to the signals transmitted by said first vehicle and to signals representative of the speed and heading of said second vehicle for deriving the relative velocity between said first and second vehicles; fourth means carried by said vehicle for deriving the line of sight between the first and second vehicles and for determining whether the direction of said relative velocity is within a predetermined angle of the line of sight between said first and second vehicles, whereby said second vehicle may be warned of an oncoming collision if the direction of the relative velocity is within a few degrees of the direction of the line of sight between the two vehicles.

12. A system for preventing collisions between two vehicles comprising: means including a transmitter carried by a first vehicle and adapted to periodically transmit signals representative of the speed and heading of said first vehicle, receiver means carried by a second vehicle and adapted to selectively receive the signals transmitted by said first vehicle, means including a computer carried by said second vehicle and responsive to the signals transmitted by said first vehicle and to signals representative of the speed and heading of said second vehicle for deriving the relative velocity between said first and second vehicles, direction finding means carried by said second vehicle and adapted to derive the direction of the line of sight between said first and second vehicles and means carried by said second vehicle for comparing the direction of said relative velocity and the direction of said line of sight whereby said second vehicle may be apprised of an on-coming collision if said directions are within a predetermined range.

13. In a system for preventing collisions between a plurality of aircraft the combination which comprises, on each aircraft to be protected, transmitting means for transmitting signals representative of the altitude, speed and heading of the respective aircraft, receiving means for selectively receiving the signals transmitted by other aircraft, means including computing means responsive to the signals received by the receiving means and to the speed and heading of the respective aircraft for deriving the relative velocity between the respective aircraft and another aircraft, means for deriving the line of sight between the respective aircraft and the other aircraft and means for determining whether the direction of said relative velocity is within a predetermined angle of the line of sight between the respective aircraft and the other aircraft, whereby the respective aircraft may be warned of an oncoming collision if the direction of the relative velocity is within a predetermined angle of the direction of the line of sight.

14. In a system for preventing collisions between two vehicles the combination which comprises transmitting means carried by each of the vehicles for transmitting signals indicative of the speed and heading of the respective vehicles, receiving means carried by each of the vehicles for receiving signals transmitted by the other vehicle, and means including computing means carried by each vehicle and responsive to the signals received by the receiving means and to the speed and heading of the respective vehicle for deriving the relative velocity between the two vehicles.

15. In a system for preventing collisions between two airborne vehicles, means carried by one of the vehicles for producing and radiating a radio-frequency carrier wave; and means carried by said one vehicle for imparting a characteristic to said carrier wave indicative of the rate of climb of said vehicle.

16. In a system for preventing collisions between two airborne vehicles, means on one of the vehicles for producing and radiating a radio-frequency carrier wave; and means on said one vehicle for modulating the carrier wave with a signal indicative of the rate of climb or descent of said vehicle.

17. In a system for preventing collisions between two aircraft, means on each aircraft for producing and radiating a radio-frequency carrier wave; and means on each aircraft for modulating the carrier wave with a signal indicative of the height of the aircraft and the rate of climb or descent of the aircraft.

References Cited by the Examiner
UNITED STATES PATENTS

| | | | |
|---|---|---|---|
| 2,480,123 | 8/49 | Deloraine | 343—112.4 |
| 2,568,568 | 9/51 | Stansbury | 343—112.4 |
| 2,933,726 | 4/60 | Campbell et al. | 343—112 |

CHESTER L. JUSTUS, *Primary Examiner.*

KATHLEEN H. CLAFFY, FREDERICK M. STRADER, NORMAN H. EVANS, *Examiners.*